United States Patent
Fang

(10) Patent No.: US 9,442,545 B2
(45) Date of Patent: Sep. 13, 2016

(54) SERVER SYSTEM AND CONTROLLING METHOD FOR OPERATION TIMING AFTER BEING POWERED UP

(71) Applicants: INVENTEC (PUDONG) TECHNOLOGY CORPORATION, Shanghai (CN); INVENTEC CORPORATION, Taipei (TW)

(72) Inventor: Lan-Lan Fang, Shanghai (CN)

(73) Assignees: INVENTEC (PUDONG) TECHNOLOGY CORPORATION, Shanghai (CN); INVENTEC CORPORATION, Taipei (TW)

(*) Notice: Subject to any disclaimer, the term of this patent is extended or adjusted under 35 U.S.C. 154(b) by 154 days.

(21) Appl. No.: 14/256,166

(22) Filed: Apr. 18, 2014

(65) Prior Publication Data

US 2015/0149792 A1    May 28, 2015

(30) Foreign Application Priority Data

Nov. 28, 2013  (CN) .......................... 2013 1 0628147

(51) Int. Cl.
*G06F 1/24* (2006.01)
*G06F 1/26* (2006.01)

(52) U.S. Cl.
CPC .. *G06F 1/26* (2013.01); *G06F 1/24* (2013.01)

(58) Field of Classification Search
CPC ................................... G06F 1/26; G06F 1/24
See application file for complete search history.

(56) References Cited

U.S. PATENT DOCUMENTS

| 5,039,875 | A  | * | 8/1991  | Chang ................. H03K 17/223 327/143 |
| 6,473,852 | B1 | * | 10/2002 | Hanjani .................... G06F 1/24 327/143 |
| 6,728,891 | B2 | * | 4/2004  | Hanjani .................... G06F 1/24 324/762.02 |
| 7,710,105 | B2 | * | 5/2010  | Chan ................. G01R 31/3181 324/142 |
| 8,614,430 | B2 | * | 12/2013 | Hou ..................... H03K 17/223 250/551 |
| 8,634,099 | B2 | * | 1/2014  | Machii ................. G06F 9/4411 358/1.16 |

* cited by examiner

*Primary Examiner* — M Elamin
(74) *Attorney, Agent, or Firm* — Bacon & Thomas, PLLC

(57) ABSTRACT

A server system and controlling method for an operation timing after being powered up are disclosed. The sever system controls a reset signal to have a voltage lower than a first voltage value by introducing a voltage monitoring module when a work power lower than a voltage threshold. On the other hand, when the work power voltage increases to higher than the voltage threshold of the voltage monitoring module, the voltage monitoring module controls the reset signal voltage to be higher than a second voltage value, whereby achieving in a technical efficacy of stable initialization and reset of the server.

7 Claims, 3 Drawing Sheets

SERVER SYSTEM AND CONTROLLING METHOD FOR OPERATION TIMING AFTER BEING POWERED UP

BACKGROUND OF THE RELATED ART

1. Technical Field

The present invention relates to a server system and method for controlling the same, and particularly to a server system and an operation timing control method for controlling the server system after being powered up.

2. Related Art

Currently, a serer typically comprises a very large scale integrated (VLSI) circuit. In some important VLSI circuits, a reset signal may adversely affect an operational timing of the server. Only when the VLSI circuits receive the reset signal, will the circuits be initialized and reset and the server work normally.

However, in the currently available circuit designs of the server, some logic devices generating the reset signal may have a glitch generated therein upon being powered up of the server. When the glitch is transmitted to the important VLSI circuit in the server, it might be taken as the reset signal by the VLSI circuit. At this time, the VLSI circuit is generally initialized since the server is being powered up, and the glitch might be taken the reset signal and thus reset the server, resulting in an affected operation of the server.

In view of the above, it may be known that there has long been an issue where a glitch might be generated by some logic elements and mistaken as a reset signal when the server is powered up. Therefore, there is quite a need to set forth an improvement means to settle this problem.

SUMMARY

In view of the issue where a glitch might be generated by some logic elements and mistaken as a reset signal when the server is powered up, the present invention discloses a server system and a controlling method for an operation timing control for a server system after being powered up.

According to the present invention, an operation timing control method for a server system after being powered up comprising steps of generating a work power and a power good signal, the work power changes from a low voltage to a high voltage when the server is powered up by a power management module; receiving the work power and the power good signal and generating a reset signal upon receiving the power good signal by a logic control module; controlling the voltage of the reset signal to be lower than a first voltage by a voltage monitor module when the work power is lower than a voltage threshold, and until the voltage of the work power higher than the voltage threshold controlling the voltage of the reset signal at higher than a second voltage and maintained for a first period (S); controlling the voltage of the reset signal to change from higher than the second voltage to lower than the first voltage and maintained a second period (T) by the logic control module; beginning to be reset and initialized by a baseboard management controller when the voltage of the reset signal is lower than the first voltage; and controlling the voltage of the reset signal to change to be higher than the second voltage after the logic control module experiences the second period (T).

According to the present invention, the server system comprises a power management module, wherein when the server is powered up, the power management module generates a work power and a power good signal and a voltage of the work power changes from a low voltage to a high voltage; a logic control module, receiving the work power and the power good signal, and generating a reset signal upon receiving the power good signal; a voltage monitor module, having a voltage threshold, controlling a voltage of the reset signal lower than a first voltage when the voltage of the work power lower than the voltage threshold, and until the voltage of the work power higher than the voltage threshold controlling the voltage of the reset signal higher than a second voltage and maintained for a first period (S); and a baseboard management controller, connected electrically to the logic control module, and beginning to be reset and initialized when the logic control module controls the voltage of the reset signal to change from higher than the second voltage to lower than the first voltage, and managing and monitoring the server system after the initialization.

The system and method of the present invention has the difference as compared to the prior art that the sever system controls the reset signal to have a voltage lower than the first voltage value by introducing a voltage monitoring module when the work power lower than a voltage threshold. On the other hand, when the work power voltage increases to higher than the voltage threshold of the voltage monitoring module, the voltage monitoring module controls the reset signal voltage to be higher than the second voltage value, whereby solving the issue encountered in the prior art, and achieving in a technical efficacy of stable initialization and reset of the server.

BRIEF DESCRIPTION OF THE DRAWINGS

The invention will become more fully understood from the detailed description given herein below illustration only, and thus is not limitative of the present invention, and wherein.

DETAILED DESCRIPTION

The present invention will be apparent from the following detailed description, which proceeds with reference to the accompanying drawings, wherein the same references relate to the same elements.

In the present invention, a reset signal is transmitted from a conventional logic control module to a baseboard management controller (BMC), into which a voltage monitoring module for stabilizing the reset signal is introduced at a circuit portion, whereby avoiding a glitch generated form the logic control module in the server is mistaken as the reset signal by the BMC, resulting in a reset on the BMC when it still has not finished its initialization process.

Figure 1A:
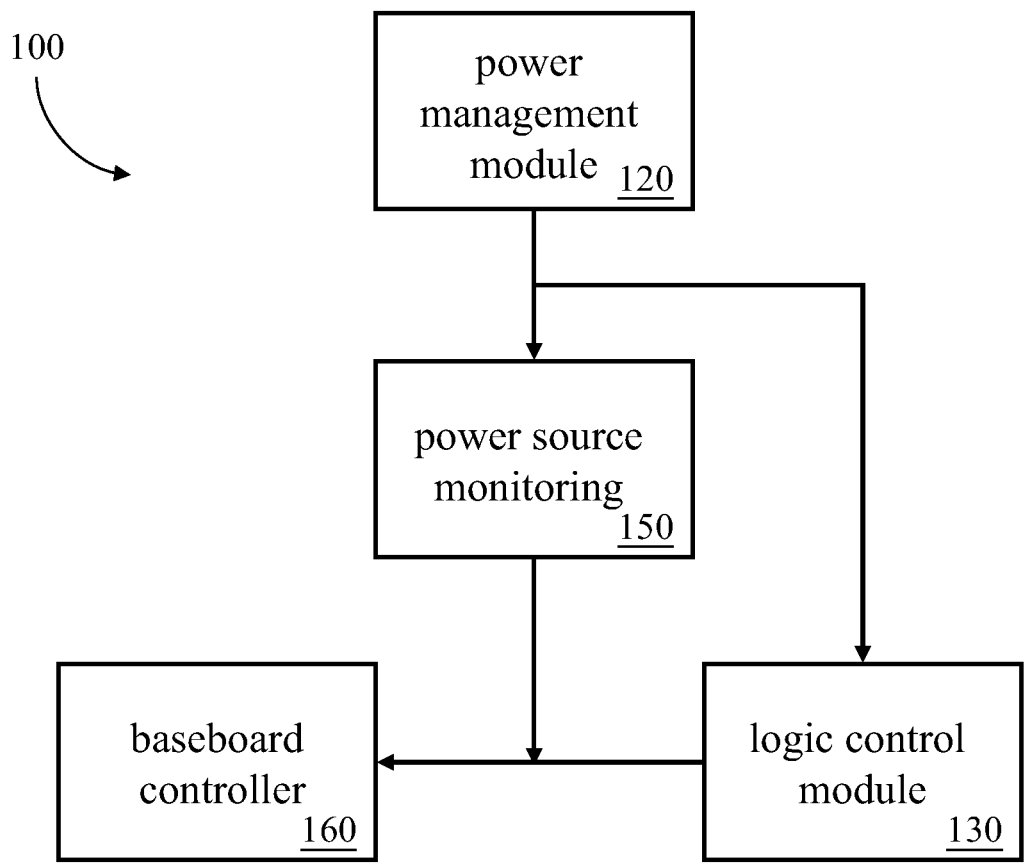
FIG. 1A is a systematic architecture diagram of a server system according to the present invention.

In what follows, FIG. 1A is first referred to describe the system operation of the present invention, in which a systematic architecture diagram of a server system according to the present invention. The server system 100 comprises a power source management module 120, a logic control module 130, a voltage monitoring module 150, and a BMC 160.

The power source management module 120 generates a work power source, and begins its operation when the server converts its power-off state to a power-on state. At this time, the generated work power source varies from its low voltage to a high voltage. And, when the generated work power source reaches a particular voltage, it will maintain a voltage of the work power source.

Generally, the power source module 120 comprises a voltage dividing unit and a voltage stabilizing unit. The voltage dividing unit may convert an external AC power source into a stable DC work power source, and the voltage stabilizing unit may maintain the voltage of the work power source generated from conversion by the voltage dividing unit.

In addition, the power source management module 120 is used to generate a power good indication signal. Generally, the power source management module 120 may generate a power good indication signal when the server is normally powered up.

The logic control module 130 begins to work after being supplied with the work power source generated by the BMC 120, i.e. continuously generate the reset signal after receiving the power good indication signal. Generally, the logic control module 130 may be a complex programmable logic device (CPLD) or a field-programmable gate array (FPGA), but these are merely examples without limiting the present invention.

The reset signal generated by the logic control module 130 is typically higher than a predetermined voltage value (in this invention, this voltage value is termed as "second voltage value"). However, the reset signal outputted from the logic control module 130 increases its voltage level from zero gradually to a second voltage value in a process from being supplied with the work power source to initialization finishing.

After the reset signal outputted from the logic control module 130 reaches the second voltage, the voltage of the reset signal reduces to another predetermined voltage value (in this invention, this voltage is termed as "first voltage value"). Namely, after the logic control module 130 is initialized, the reset signal may be controlled to have a voltage from the second voltage value to lower than a first voltage value. In this invention, the first voltage value is smaller than the second voltage value, i.e. the voltage of the reset signal may become low from high.

In addition, the logic control module 130 may maintain at the voltage of the reset signal after the reset signal is controlled to lower than a first voltage value, enabling the reset signal to stay lower than the first voltage value for a period of time (S). In this invention, the period of time for the logic control module 130 maintaining the voltage of the reset signal lower than the first voltage value (S) is termed as "first period of time", such as 8 microseconds. However, this is merely an example, without limiting the present invention.

In some embodiments, the reset signal generated from the logic control module 130 may be an open drain signal outputted by an open drain (OD) or an open collector signal outputted by an open collector (OC).

Figure 1B:
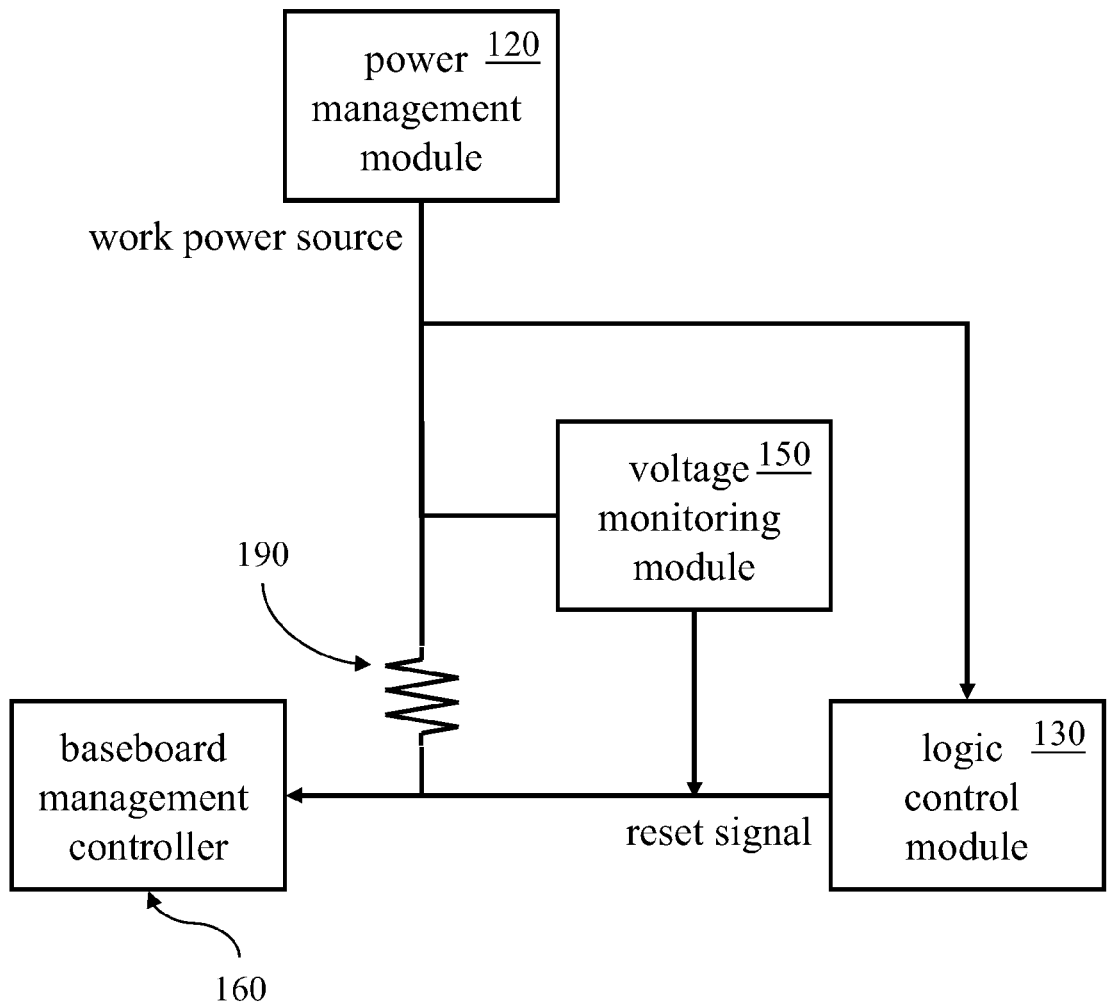
FIG. 1B is a schematic diagram of a circuit according to an embodiment of the present invention.

The logic control module 130 transmits the reset signal generated to the circuit of the BMC 160, which is connected to the resistor 190, as shown in FIG. 1B. The resistor 190 has an end without connecting with the circuit for transmitting the reset signal and the end is connected to the power source management module 120. The work power source outputted from the power source management module 120 goes through the resistor 190.

The voltage monitoring module 150 controls the voltage level of the reset signal, and has a voltage threshold. When work power source generated by the power source management module 120 is lower than the voltage threshold, the voltage monitoring module 150 may control the voltage of the reset signal into the BMC 160 to become lower than the first voltage value. With the gradual increase of the work power source generated by the power source management module 120, the voltage monitoring module 150 may control the reset signal into the BMC 160 to be higher than the second voltage value, when the voltage of the work power source generated by the power source management module 120.

After the voltage monitoring module 150 control the reset signal into the BMC 160 to have its voltage level to be higher than the second voltage value, it may continuously control the voltage of the reset signal into the BMC 160, so that the reset signal into the BMC 160 may be maintained at higher than the second voltage value within a period of time (T). In this invention, the period of time (T) when the voltage of the reset signal is maintained higher than the second voltage value (T) by the voltage monitoring module 150 is termed as "second period of time". However, the present invention is not merely limited to this example.

The BMC 160 is electrically connected to the logic control module 130, and control to launch a reset action and begin to initialize when the voltage of the reset signal is controlled by the logic control module 130 from higher than the second voltage value to lower than the first voltage value. Further, the BMC 160 also manages and monitors the server system 100 after the initialization.

Figure 2:
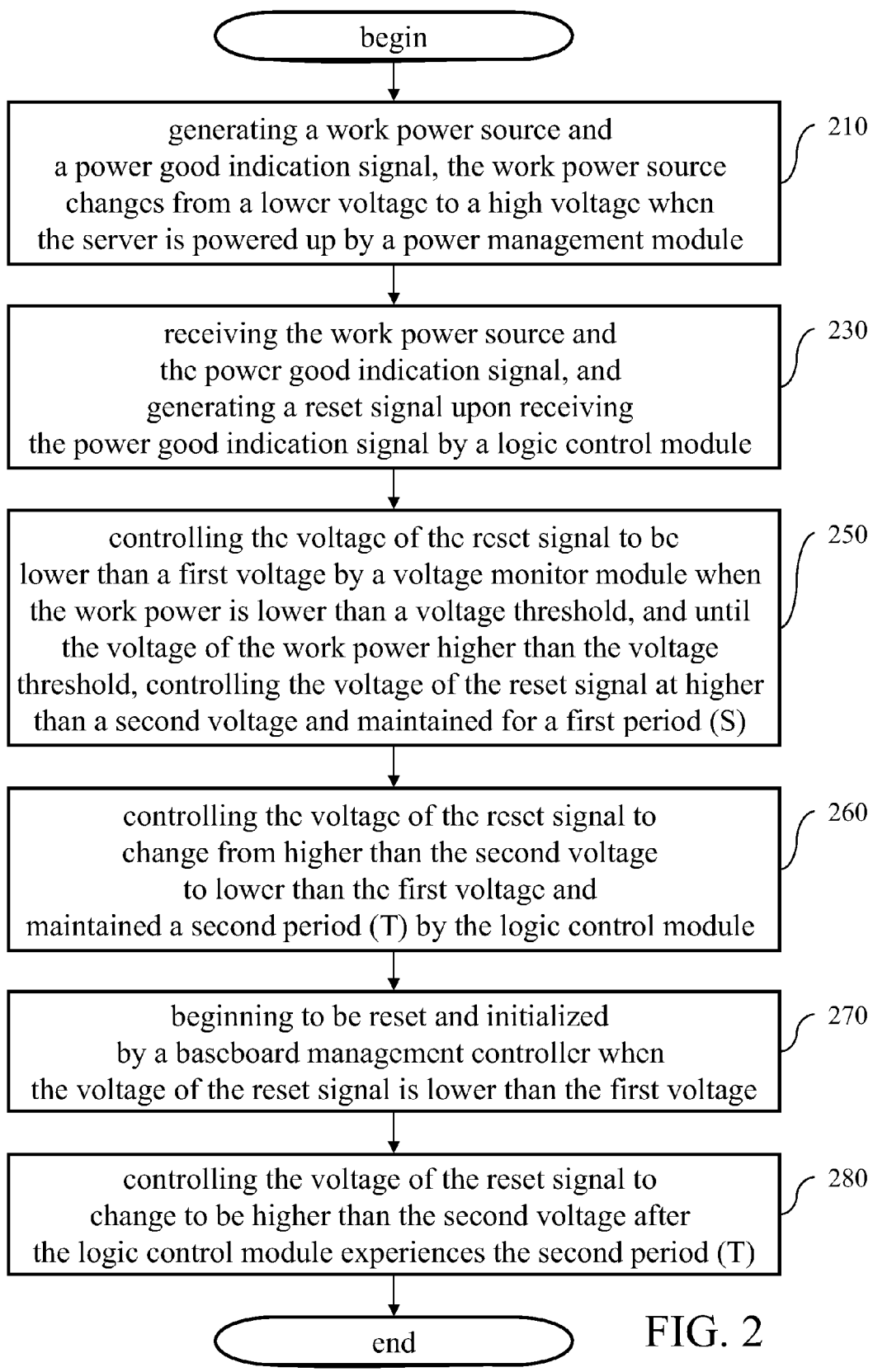
FIG. 2 is a flowchart diagram of an operation timing control method for a server system after being powered up according to the present invention.

Thereafter, an embodiment is set forth to explain how the system and method of the present invention operates, with reference to FIG. 2 simultaneously, in which a flowchart diagram of an operation timing control method for a server system after being powered up according to the present invention is shown.

After the server system 100 is connected to an external power source and thus powered up, the power source management module 120 may acquire the external power source and generate the work power source and the power good indication signal (S210). In this embodiment, assume the power source management module 120 is a standby power source management module for managing the AC power source, the work power source generated when the power source management module 120 receives a control signal for the standby mode is a standby work power source. The generated power source indication signal is a standby power good indication signal.

After the power source management module 120 generates the work power source and the power good indication signal (S210), it may provide the work power source generated to the logic control module 130, the voltage monitoring module 150 and the BMC 160.

When the logic control module 130 acquires the work power source generated by the BMC 120, it begins to work. At the same time when the logic control module 130 normally works, it begins to generate the reset signal after receiving the power good indication signal generated by the BMC 120 (S230).

In this embodiment, during the period that the voltage of the work power source reaches a normal work power source, such as 3.3V, generated by the power source management module 120, the logic control module 130 outputs its reset signal from low gradually to high in voltage. However, in the course of gradual increased voltage, the reset signal might suddenly has a glitch, i.e. the reset signal might reduces to zero suddenly in a very short time in it voltage and then abruptly increase a voltage even higher than the time before reducing to zero and increase continuously.

Similarly, the voltage monitoring module 150 will begin to work after receiving the work power source generated by the power source management module 120. Namely, the voltage monitoring module 150 controls the reset signal into the BMC 160 to have its voltage lower than the first voltage, when the until work power source generated by the power source management module 120 is lower than the voltage threshold. Until the voltage of the work power source generated by the power source management module 120 is higher than the voltage threshold, will the voltage monitoring module 150 control the reset signal into the BMC 160 to be higher than the second voltage in its voltage, and continuously maintain the reset signal into the BMC 160 higher than the second voltage value in its voltage within a first time period (S) (S250).

Namely, in this embodiment, in the time period when the work power source generated by the power source management module 120 reaches the voltage threshold, such as 2.8V, the voltage monitoring module 150 may continuously control the voltage of the reset signal into the BMC 160 so that the voltage of the reset signal generated by the logic control module 130 into the BMC 160 is lower than the first voltage value, such as 0.5V. Therefore, even the reset signal generated by the logic control module 130 produces a glitch, the voltage monitoring module 150 may guarantee the reset signal into the BMC 160 will not be affected by the glitch.

Afterwards, as the voltage of the work power source generated by the power source management module 120 increases, the voltage monitoring module 150 controls the reset signal into the BMC 160 to have its voltage higher than the second voltage value, such as 3.0V, when the work power source generated by the power source management module 120 have its voltage reaching the voltage threshold, and continuously controls the reset signal into the BMC 160 at a first time period (S) before the reset signal into the BMC 160 maintains higher than the second voltage value, so that the reset signal of the BMC 160 have its voltage higher than the second voltage value within the first time (S). At this time, the logic control module 130 will soon work normally since the voltage of the power source generated by the power source management module 120 will soon reach the normal work voltage.

After the logic control module 130 begins to work normally, the logic control module 130 may control the generated reset signal from higher than the second voltage value to lower than the first voltage value in its voltage, and continuously controls the voltage of the generated reset signal to maintain lower than the second voltage value within the second time period (T), and the voltage of the reset signal is lower than the first voltage value within the second time period (T) (S260). As such, after the reset signal having its voltage lower than the first voltage into the BMC 160, the BMC 160 may begin to reset and initialize (S270).

After the BMC 160 resets and initializes (S270), i.e. after the second time period (T) after the voltage of the reset signal maintain lower than the first voltage value by the logic control module 130, it may control the generated reset signal to be lower than the first voltage value to higher than the second voltage value in its voltage (S280).

It may be known from the above that the present invention may certainly avoid the BMC 160 from being adversely affected by the glitch generated from the logic control module 130 and thus being reset before being completely initialized.

In view of the above, it may be known that the system and method of the present invention has the difference as compared to the prior art that the sever system controls the reset signal to have a voltage lower than the first voltage value by introducing a voltage monitoring module when the work power lower than a voltage threshold. On the other hand, when the work power voltage increases to higher than the voltage threshold of the voltage monitoring module, the voltage monitoring module controls the reset signal voltage to, be higher than the second voltage value, whereby solving the issue encountered in the prior art where the logic element might generate the glitch might be mistaken as the reset signal, and achieving in a technical efficacy of stable initialization and reset of the server.

Furthermore, the controlling method for an operation timing after being powered up according to the present invention may be implemented in a hardware. Alternatively, the method may also be implemented in a single unit or separate computer systems connected with one another with discrete components arranged therein.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A server system, comprising:
 a power management module, wherein when the server is powered up, the power management module generates a work power and a power good signal and a voltage of the work power changes from a low voltage to a high voltage;
 a logic control module, receiving the work power and the power good signal, and generating a reset signal upon receiving the power good signal;
 a voltage monitor module, having a voltage threshold, controlling a voltage of the reset signal lower than a first voltage when the voltage of the work power lower than the voltage threshold, and until the voltage of the work power higher than the voltage threshold controlling the voltage of the reset signal higher than a second voltage and maintained for a first period (S); and
 a baseboard management controller, connected electrically to the logic control module, and beginning to be reset and initialized when the logic control module controls the voltage of the reset signal to change from higher than the second voltage to lower than the first voltage, and managing and monitoring the server system after the initialization.

2. The server system as claimed in claim 1, wherein the logic control module controls the voltage of the reset signal to higher than the second voltage after controlling the voltage of the reset signal to change from higher than the second voltage to lower than the first voltage and maintained for a second period (T).

3. The server system as claimed in claim 1, wherein the power management module is a standby power management module managing an alternative current (AC) power, the work power is a standby work power, and the power good signal is a standby power good signal.

4. The server system as claimed in claim 1, wherein the first voltage is lower than the second voltage.

5. The server system as claimed in claim 1, wherein the power management module comprises a voltage dividing unit and a power stabilizing unit.

6. The server system as claimed in claim 1, wherein the logic control module is one of complex programmable logic device (CPLD) and field-programmable gate array (FPGA).

7. The server system as claimed in claim 1, wherein the reset signal generated by the logic control module is one of an open drain (OD) signal and an open collector (OC) signal, and the reset signal is connected to a resistance at one side and the resistance is connected to the work power at the other side.

* * * * *